(No Model.)
C. R. HARTMAN.
SPRING ATTACHMENT FOR AGRICULTURAL IMPLEMENTS.
No. 386,982. Patented July 31, 1888.
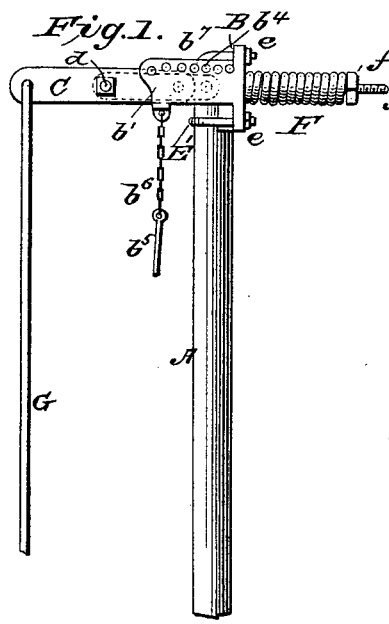
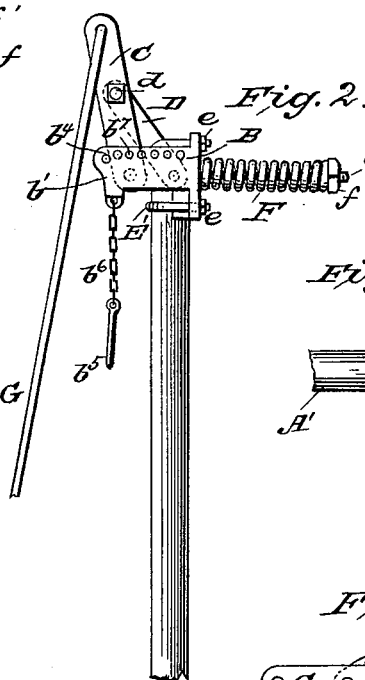
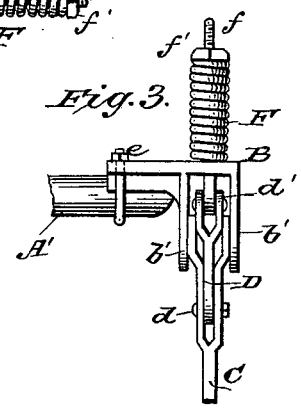
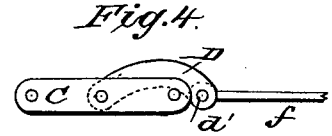
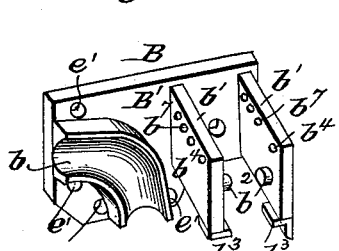
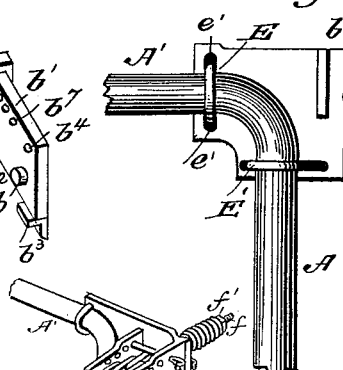
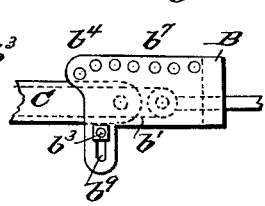
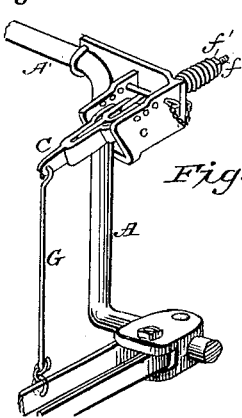
WITNESSES:
Fred G. Dieterich
P. B. Turpin
INVENTOR:
C. R. Hartman
BY Munn & Co.
ATTORNEYS.
N. PETERS, Photo-Lithographer, Washington, D. C.

UNITED STATES PATENT OFFICE.

CHARLES R. HARTMAN, OF VINCENNES, INDIANA.

SPRING ATTACHMENT FOR AGRICULTURAL IMPLEMENTS.

SPECIFICATION forming part of Letters Patent No. 386,982, dated July 31, 1888.

Application filed September 1, 1887. Serial No. 248,539. (No model.)

*To all whom it may concern:*

Be it known that I, CHARLES R. HARTMAN, of Vincennes, in the county of Knox and State of Indiana, have invented a new and useful Improvement in Spring Attachments for Agricultural Implements, of which the following is a specification.

My invention relates to spring attachments for plows, cultivators, and other similar agricultural implements, wherein one or more plows, shovels, or gangs are to be lifted from the ground by the action of the spring while turning the implement at the end of the row or when it is desired to travel from place to place, and also wherein the action of the spring assists the operator in guiding the plow, shovels, or gangs.

The object of my invention is to provide a device for the purpose specified, of simple, strong, and inexpensive construction, which will respond readily to the required action, and will also provide a secure support for holding the gangs high and out of the way of all obstructions without requiring a rearward extension of the tongue back of the arch of the cultivator.

The improvements consist in certain constructions and combinations of parts hereinafter particularly described and claimed, with reference to the accompanying drawings, wherein—

Figure 1 is a side elevation of my improved attachment applied to the arch of a cultivator with the parts in their working position; Fig. 2, a similar representation of the same with gangs raised to their highest or in their inoperative position; Fig. 3, a plan of the same with the parts shown in the same position as in Fig. 1 and with the arch broken away. Fig. 4 is a detail showing a modification of the lifting-lever and link-connection. Fig. 5 is a perspective view of the main bracket. Figs. 6 and 7 are detail views of parts showing somewhat different constructions from those shown in the other views, and Fig. 8 is a perspective showing the improvements in connection with the drag-bars of a cultivator.

To the right-hand vertical post A and horizontal part A' of a cultivator-arch is secured a bracket, B, by means of a stirrup, E, which embraces the horizontal part A', and a stirrup, E', which embraces the post A of the arch. The stirrups pass through holes in the said bracket and are fitted with screw-nuts $e$ upon their ends. The bracket B is, by preference, formed in a single piece and of malleable iron; but, manifestly, the bracket may be of other material or be formed in sections firmly united together without departing from some of the broad features of my invention.

In the construction shown in Figs. 1 to 5, and most clearly in Fig. 5, the bracket is formed with a front or main plate, B', which has formed through it bolt-openings $c'$ $e'$ for the arms of the stirrups E E'. This front plate, B', has its rear face grooved at $b$ to receive the corner of the arch, such groove being preferably provided by flanges formed upon the main plate, as shown in Fig. 5. With this groove fitting the arch and the clips or stirrups E E' tightened up, the bracket will be firmly secured in its place.

In the construction shown in Fig. 6 the groove $b$ is omitted and the openings $e'$ for the stirrup E are united or extended, as are also those for the stirrup E', forming slots which are of sufficient length to permit a limited vertical and lateral or horizontal adjustment of the bracket, as may be desired.

Cheek-plates $b'$ $b'$ extend parallel to each other rearwardly from the main plate, and are arranged outside of the upright of the arch, as shown in Figs. 1 and 3. The inner faces of the cheek-plates $b'$ have lugs $b^2$ upon them to pivotally support the forward end of the forked lifting-lever C, the rear end thereof being connected with the upper end of a rod, G, upon which is suspended the gang of a cultivator pivoted to the axle in the usual way, as will be understood from Fig. 8.

The lever C is forked at its forward end to receive the single end of a link, D, which is pivoted thereto by a bolt, $d$, and the forward or forked end of the link D is pivoted to the spring-rod $f$ by a bolt, $d'$. A spiral spring, F, encircles the bolt $f$, and is held and adjusted thereon to bear against the section B' of the bracket B by a nut, $f'$, fitted upon the threaded end of said bolt.

The cheek-plates $b'$ have stop-checks $b^3$ projecting inwardly from their rear ends and lower edges, upon which the forked lifting-lever C may rest when the plows or gangs are in their working position. Stop-check holes $b^4$ are provided at the rear end of the cheek-plates, which receive a cotter, $b^5$, suspended by a chain, $b^6$, from the rear end of the bracket B, which serves to hold the lever C with the suspension rod and plow-gang attached in their highest raised positions when traveling, and stop-check holes $b^7$ are also provided which receive the cotter, and are used to limit the upward movement of the plow-gang to be within easy reach of the operator to drop the gangs suddenly and at the right time.

The operation of my attachment is as follows: When forked lifting-lever C is resting upon the stop-checks $b^3$, the pivot-bolts $d\ d'$ and pivot-lugs $b^2$ are in line with each other, or on dead-centers, and the power of the spring, although at its greatest tension, does not affect the normal run of the gangs or depth of the shovels; but if the operator desires to suspend the gang above ground he raises it sufficiently for the spring to overcome the centers, when it will raise the lever C to its limit, as shown in Fig. 2 of the drawings, if the tension of the spring is sufficient. The tension of the spring may be easily regulated by gripping with the hand both the spring and the nut $f'$ and turning the same either to loosen or tighten the spring, either to merely hold the gangs at the height the operator has raised them to or at once raise them to their highest limit after the operator has raised them sufficiently for the spring to exert action. When the gang is raised to its utmost height, it is held securely in said position by passing the cotter $b^5$ through the stop-check holes $b^4$, and the cultivator may be drawn from place to place over rough ground or along the roads when traveling without obstruction. When the cotter $b^5$ is placed in any one of the stop-check holes $b^7$, the lifting-lever C and the gang suspended therefrom are checked in their upward movement when the adjusted limit of movement has been reached. When the cotter is put in a suitable one of the forward holes, the gangs may be raised the required height, and no further, to enable the cultivator to be easily turned at the ends of the rows. The driver can quickly dispose of the gangs and guide his team into the next row by tossing up the handles of the gangs and by a slight downward pressure drop the gangs again at the right moment to catch the first hill of the new row.

Not only can the gangs be raised and lowered with great facility by this attachment, but the gangs may be shifted sidewise with ease to follow the furrow or avoid obstructions with greater ease, as there is no deadweight to handle, for, although the spring is powerless to exert any control over the normal run of the gangs when the lever C is quite down and the rod G has been adjusted suitably for this level, yet it imparts a very perceptible buoyancy to the gangs, as the operator will continually, though unintentionally, raise them more or less in shifting them in and out when the nature of the work requires.

When it is required to use a movable pivot to connect the forked lifting-lever to the bracket instead of the fixed lugs $B^2$, the link D is curved, as shown in Fig. 4, to pass over the said pivot-bolt, or the lugs $b^2$ may be formed upon the outer sides of the forward end of the forked lifting-lever to engage with any two holes in the bracket-plates, in which case the lever C may be sprung into place by compressing its forward arms before the link D is put into place. For this reason the bolt $d$, instead of a rivet, is used.

Other forms of springs may be used with this attachment; but I prefer a spiral spring as the most efficient.

In practice it is intended that the rods G shall be of such length as not to hold the lever C down to the checks, but let it be raised more or less clear of the checks, to allow the spring to do more or less lifting, and so render the management of the gangs easier to the operator while at work.

The office of the checks $b^3$ is to prevent the lever C from being drawn down past the centers. It is not generally necessary to employ the action of the spring for downward pressure on the gangs of cultivator to force the shovels to take hold, (run deeper,) but where such is the case in cultivators or other agricultural implements I provide the outside cheek-plate in the arrangement shown, the right-hand cheek with a slot, $b^9$, at its rear lower edge, and provide the check $b^3$, in the form of a bolt, Figs. 6 and 7, which serves as an adjustable stop-check to the lever C, and by adjusting this stop-check higher or lower in the slot $b^9$ the downward pressure on the beams or gangs may be varied. By tightening the nut on the stop-check bolt the stop-check may be fixed at any desired point.

Some cultivators have extensions of their drag-bars or arms projected from their drag-bar couplings in front of the axle. If it is desired to use my attachment on such cultivators, the attachment may be inverted or turned upside down and applied to the front instead of the rear of the arch, when it will operate by downward pressure on the forward extensions or parts of, instead of by a lifting action on the main portion of, the drag-bars.

I claim as my invention and desire to secure by Letters Patent—

1. An attachment for implements of the class specified, comprising the bracket B, having cheek-plates $b'$, a forked lifting-lever, C, supporting the shovels and pivoted at one end to the cheek-plates, link D, pivoted between the forked arms of said lifting-lever, and a spring-rod connected with the forward end of said link, to operate substantially as and for the purpose specified.

2. The combination, with an implement of the class specified, of the bracket B, having cheek-plates $b'$ projecting therefrom, and having a stop check or checks at the rear or outer end, a forked lifting-lever, C, supporting the shovels and pivoted at one end to the lugs upon the cheek-plate, link D, pivoted between the forked arms of the said lifting-lever, and a spring-rod connected with said link, substantially as described, for the purpose described.

3. An implement of the class specified, comprising a bracket, B, having projecting cheek-plates, one of which is provided with an adjustable stop-check, the lifting-lever C, pivoted thereto, a link, D, and an actuating-spring, substantially as and for the purpose described.

4. The combination, with the implement of the class specified, of a bracket secured to the frame, having projecting cheek-plates, a forked lifting lever pivoted to the said cheek-plates, a link, D, pivoted at one end to said lifting-lever intermediately of the length of such lever and connected with the actuating-spring, the said connections being held substantially in line with each other when the shovels are at work, substantially as described, and for the purpose specified.

5. The combination, with the implement of the class specified, of a bracket, B, secured to the frame, having projecting cheek-plates $b'$ and a check stop or stops, $b^3$, at the end thereof, a lifting-lever, C, link D, spring-actuated rod $f$, and shovel-gang suspension-rod G, combined to operate substantially as described, for the purpose specified.

6. The combination, with the implement of the class specified, of a bracket, B, secured to the frame, having projecting cheek-plates $b'$ and check-holes $b^4$ at the ends of said plates, lifting-lever C, link D, spring-actuated rod $f$, shovel-gang suspension-rod G, and a cotter secured to the bracket and adapted to support the said lifting mechanism in their raised position, substantially as described.

7. The combination, with the implement of the class specified, of a bracket, B, secured to the frame, having projecting cheek-plates $b'$ and check-holes $b^7$, lifting-lever C, link D, spring-actuated rod $f$, shovel-gang suspension-rod G, and a cotter adapted to the check-holes $b^7$ to limit the movement of the plow-gang, substantially as described.

8. The combination, with the implement of the class specified, of a bracket, B, secured to the frame and having a check stop or stops, $b^3$, check-holes $b^4$, check-holes $b^7$, a cotter to fit said check-holes, a lever, C, link D, spring-actuated rod $f$, and gang-suspension rod G, substantially as and for the purpose described.

9. In an attachment substantially as described, a bracket having a main or front plate adapted for connection with the machine-frame, and the cheek-plates extended from the main plate and provided with bearings for the pivots of the lever and link and with a check stop or stops, substantially as and for the purposes specified.

CHARLES R. HARTMAN.

Witnesses:
LOUIS A. MEYER,
B. M. WILLOUGHBY.